T. G. CUSHMAN.
SHOCK ABSORBER.
APPLICATION FILED AUG. 8, 1910.
996,220.
Patented June 27, 1911.
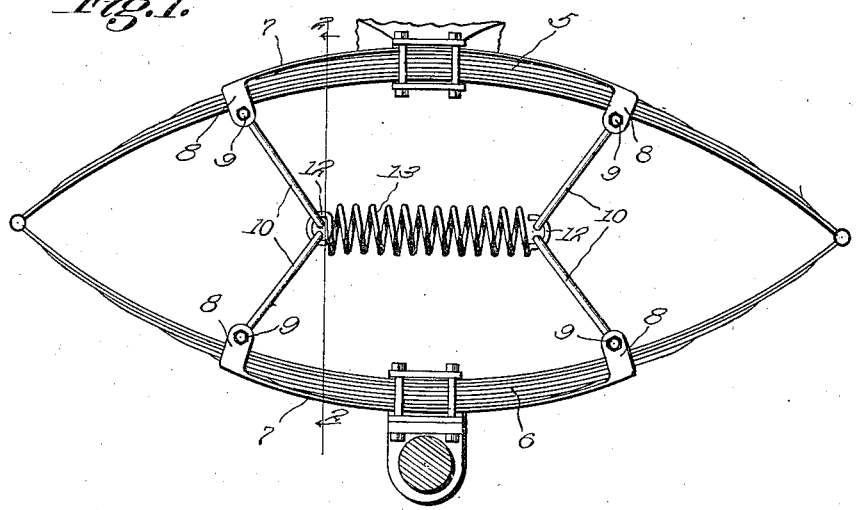
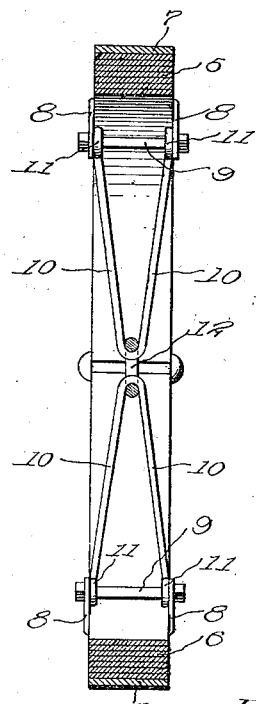

UNITED STATES PATENT OFFICE.

THOMAS G. CUSHMAN, OF SUNLAND, CALIFORNIA.

SHOCK-ABSORBER.

996,220.  Specification of Letters Patent.  Patented June 27, 1911.

Application filed August 8, 1910. Serial No. 576,244.

*To all whom it may concern:*

Be it known that I, THOMAS G. CUSHMAN, a citizen of the United States, residing at Sunland, in the county of Los Angeles and State of California, have invented new and useful Improvements in Shock-Absorbers, of which the following is a specification.

This invention relates to a novel form of shock absorber adapted to be applied more or less directly to vehicle springs.

The prime object of this invention is to provide a shock absorber which will act to resiliently limit the movement of vehicle springs, such as on automobiles, and act at the same time to prevent any distortion of the spring. It is well known that, especially where the lower half of a spring is not provided with a radius rod, that the lower spring portion center not only moves to and from the upper spring portion center but has a horizontal movement. This horizontal movement is caused by the horizontal resistance to road travel, and particularly caused by the wheels meeting with some obstruction which causes them to be momentarily pressed rearwardly, thus carrying the lower spring half rearwardly and consequently deforming the spring.

My invention is designed to return the spring to a symmetrical form as well as to counteract excessive movements. Its action in so doing will be better understood from the following specification and accompanying drawings in which—

Fiugre 1 is an elevation showing my improved shock absorber attached to a typical vehicle spring. Fig. 2 is an enlarged section taken on line 2—2 of Fig. 1.

In the drawings 5 and 6 designate the upper and lower opposed portions of a full elliptic spring generally used on vehicles and particularly on automobiles. It will be understood that I do not limit myself to the particular form of spring shown, some springs being made with only one of the portions, being semi-elliptic, and others being of various composite forms. In the case where only one portion of the spring is used, the part of the vehicle to which the other portion of the spring would be attached is used for the attachment of my absorber. Thus, if the upper portion 5 is not used and lower portion 6 attached directly to the frame of the vehicle, the upper portions of my absorber are also directly attached to the vehicle instead of being attached to portion 5. In this connection it will be understood that when I speak of "opposed portions" of the spring, not only are spring portions proper to be understood, but also those portions of the vehicle frame which may be opposed to the single member of the semi-elliptic spring or the like.

Situated above and beneath portions 5 and 6 are resilient straps 7 which extend outwardly from the center of the spring and are provided on their ends with ears or lugs 8 which form a place of attachment for bolts 9 to which links 10 are pivoted. This is the only function of straps 7; and it is consequently not absolutely necessary that they should be provided in the exact configuration shown. Any device which will afford support for bolts 9 at or near the positions indicated and which will allow the leaves of the spring portion to be free to have a sliding motion over each other is sufficient.

Links 10 are pivoted to bolts 9 by means of eyes 11 on their ends, the links being made in the V or U configuration shown in Fig. 2. The inner ends of the links are situated as shown in Fig. 1 and are connected together by a loop or ring 12 which may be made integrally with the material of spring 13 as illustrated, or the rings or loops may be made separate from the spring, their function being to connect the inner ends of the links together and to afford means for the connection of spring 13 to the points of connection of the links. Spring 13 is a tension spring, its ratio of resistance to distortion being made to suit any particular situation. Links 10 may be stiff, as shown, or may be flexible, as a chain or cable.

The links and springs being arranged normally in the positions shown, it will be seen that the vehicle spring may be compressed without any resistance by spring 13, while an extension of the vehicle spring will cause an extension of spring 13. Most of the damage to springs is done on the upward movement of the vehicle frame—when the spring is extended. It will be seen that when the vehicle springs are extended, links 10 are brought more nearly into a straight line position and the extension of spring 13 for a given extension of the vehicle spring is greatly lessened, thus increasing the leverage of spring 13 over the force which is extending the vehicle spring. This provides that a gradually increasing force be applied to prevent the upward movement of the vehicle frame on the vehicle axle. This is as it should be, as it is desirable that the vehicle axle should move upwardly toward the vehicle frame without exerting a large amount of upward force on the frame, while it is equally desirable that the vehicle frame should be retarded in its movement up from the axle, thus doing away with that very objectionable feature known as the "rebound" attending an uncontrolled vehicle spring.

From the drawings it can be seen that if one side of the spring opens up more than the other; if the lower spring portion is carried rearwardly and the spring thrown into an unsymmetrical form; then the spring 13 and the system of connecting links will tend to pull the whole arrangement back to the normal position shown. Conversely, the spring 13 will also tend to prevent the main spring from assuming an unsymmetrical position; and in so doing will prevent spring breakage. A large number of spring breakages on automobiles are due to distortion of the spring carried by horizontal shocks. My device will minimize such occurrences.

I am aware that springs and links have heretofore been in use for shock absorbers; and particularly in the device patented to one Pratt, on June 18, 1907, No. 857,256. But I do not claim broadly such features as are common to the Pratt device and my own, claiming only the combination in my arrangement which renders my construction an equalizer as well as a shock absorber.

Having described my invention, I claim:

1. In combination with a vehicle spring comprising opposed portions having relative movement, two pairs of links, the links of each pair being pivotally connected to opposite portions of the opposed spring portions and on opposite sides of the spring portion centers from the links of the other pair and at points approximately midway the spring portion centers and their ends, means for pivotally connecting the free ends of the links of each pair together, and a tension spring secured between the link end connections and normally holding the pairs of links extending inwardly toward each other and resisting their outward movement.

2. In combination with a vehicle spring of the "full elliptic" class and composed of two opposing portions, a strap, secured at its center to each of the spring portions at the center thereof, clips on the ends of the straps and loosely surrounding the spring portions at points approximately midway the spring portion centers and their ends, a link pivoted to each of the clips and extending diagonally inwardly toward the link attached to the opposite clip and toward the center of the spring, loose connections between the free ends of opposite links, and a tension spring attached to and extending between the connections.

In witness that I claim the foregoing I have hereunto subscribed my name this first day of August 1910.

T. G. CUSHMAN.

Witnesses:
 JAMES T. BARKELEW,
 ELWOOD H. BARKELEW.

---

Copies of this patent may be obtained for five cents each, by addressing the "Commissioner of Patents, Washington, D. C."